United States Patent Office 3,438,487
Patented Apr. 15, 1969

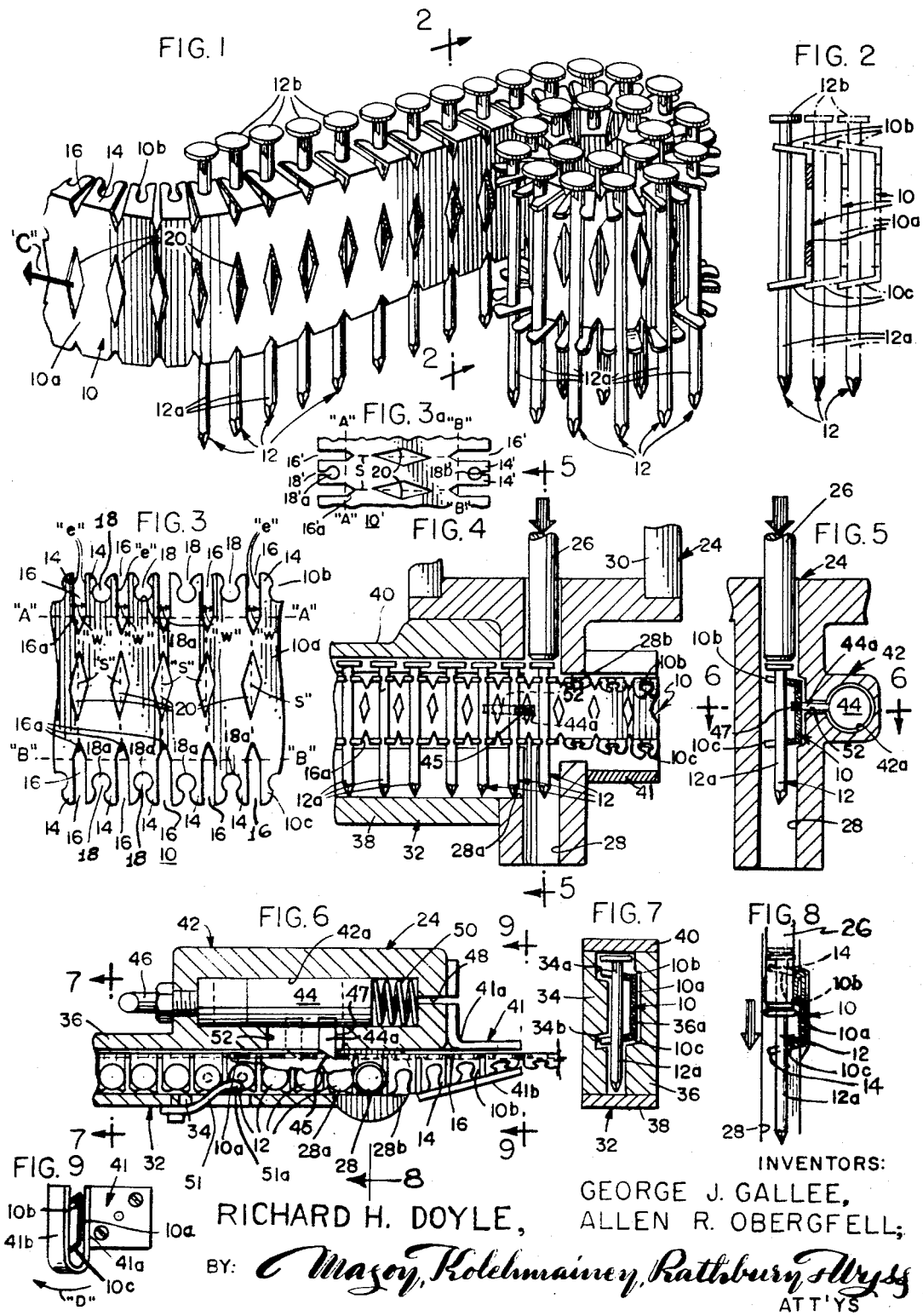

3,438,487
CARRIER FOR HOLDING A PLURALITY OF FASTENERS
George J. Gallee, Rosemont, Allen R. Obergfell, Park Ridge, and Richard H. Doyle, Mount Prospect, Ill., assignors to Fastener Corporation, Franklin Park, Ill., a corporation of Illinois
Filed May 10, 1967, Ser. No. 637,510
Int. Cl. B65d 83/00, A45c 11/00
U.S. Cl. 206—56                                10 Claims

ABSTRACT OF THE DISCLOSURE

A carrier for holding a plurality of fasteners with their shanks in spaced-apart, parallel relation comprising an elongated flexible strip extending transversely of the fastener shanks and having a substantially U-shaped cross section. The strip includes a web and a pair of flanges along the upper and lower edges thereof for supporting the shanks of each fastener, and each flange comprises a plurality of independently movable shank holding segments. Each segment includes a slot opening at the free end for receiving the shank of a fastener, and adjacent segments along each flange are separated from one another by slits extending laterally transversely of the flanges and terminating in the web portion of the strip. A plurality of openings are spaced longitudinally along the web of the strip and each is offset longitudinally of an adjacent fastener shank held by the strip so that a reciprocal feeder means of a driving tool can readily engage the strip to successive fasteners advancing into the drive track of the driving tool.

---

The present invention relates to a new and improved carrier for holding a plurality of fasteners, such as nails and the like, with their shanks in spaced-apart, parallel relation. More particularly, the present invention is especially adapted for use in automatic fastener driving tools of the pneumatic or electrically powered type.

Many fastener driving tools are now available which are capable of driving large fasteners, such as 8d or 6d common nails. For tools of this type, it is desirable to supply the nails to be driven from a continuous strip with the nail shanks in spaced-apart relation. The strip must be flexible so that it may be coiled to conserve space and yet strong, so that it does not easily break or permit the fasteners to be inadvertently detached therefrom. However, the strip must be capable of readily releasing the fasteners as they are driven by the driver of the tool.

One of the disadvantages associated with prior art strips is that glue or other adhesives are often required to hold the fasteners on the strip, and the glue or adhesive, together with pieces or portions of the adjacent strip material, remains on the fastener and is driven into the workpiece. Sometimes these pieces protrude from the surface of the workpiece around the head of the driven fastener and must be removed, which is time consuming and expensive. Another disadvantage of prior art strips is that oftentimes the strip is torn into many small pieces or bits during a driving stroke, and these pieces sometimes cause fouling or malfunctioning of the driving tools and, in addition, clutter the work area.

Therefore, it is an object of the present invention to provide a new and improved carrier for holding a plurality of fasteners, such as nails and the like, with their shanks in spaced-apart relation, and especially adapted for use in driving tools.

Yet another object of the present invention is the provision of a new and improved carrier of the type described wherein glue or other adhesives are not required to hold the fasteners in the carrier strip.

Still another object of the present invention is the provision of a new and improved carrier strip of the character described which is strong, yet flexible for coiling, and which will not easily break or shear or permit fasteners to be easily removed therefrom.

Yet another object of the present invention is the provision of a new and improved carrier strip of the character described which is readily shearable after the fasteners have been driven therefrom so that an excessive length of spent carrier strip does not protrude from the driving tool.

Still another object of the present invention is the provision of new and improved means for facilitating the shearing off of the spent carrier strip protruding from the driving tool.

Still another object of the present invention is the provision of a new and improved carrier strip of the type described which can be readily coiled in opposite directions without causing the strip to break or sever, and without releasing the fasteners held thereby.

Yet another object of the present invention is a new and improved carrier strip of the character described, including means therein for aiding the advancement of the strip and fasteners toward the drive track of the driving tool.

Yet another object of the present invention is to provide a new and improved carrier strip which firmly holds the fasteners in position therein yet permits the fasteners to be readily and clearly detached from the strip without tearing or severing thereof as the fasteners are driven by the driver of a tool.

Briefly, the foregoing and other objects of the present invention are accomplished in one embodiment thereof comprising a carrier adapted to hold a plurality of fasteners with their shanks in spaced-apart parallel relation. The carrier comprises an elongated strip of flexible plastic material extending transversely of the fastener shanks and having a substantially channel-shaped cross section. The strip includes a web or body portion which is laterally offset from the plane of the fastener shanks and two rows of spaced segments are provided along the upper and lower longitudinal edges of the web portion. The segments are independently movable, and each has a free outer end and an inner end pivotally joined to the web portion. The segments in each row are spaced from adjacent segments on either side thereof by slits or cuts which extend laterally transversely of the carrier and terminate in sharp notches formed in the web of the strip. The web is provided with a plurality of longitudinally spaced-apart openings, each opening being offset longitudinally on the strip from an adjacent fastener shank held thereby. Each opening is spaced between a pair of notches on the edges of the strip, and the opening and notches cooperate to focus tearing stress within the web and thus facilitate the severance of the spent strip. The opening may be used to receive the lug or pawl of a reciprocating feeding member for advancing the strip and its fasteners incrementally forwardly and thereby position successive fasteners in the drive track of the driving tool.

For a better understanding of the present invention, reference should be had to the following detailed description when taken in conjunction with the drawings, in which:

FIG. 1 is a perspective view of one embodiment of a carrier strip with fasteners therein, constructed in accordance with the present invention;

FIG. 2 is a transverse sectional view of the carrier and fasteners of FIG. 1 taken substantially along the line 2—2 of FIG. 1;

FIG. 3 is a plan view of a segment of the carrier of

FIG. 1 as a flat strip before the strip is formed into a channel-shaped cross section;

FIG. 3a is a view similar to FIG. 3 of a modified carrier in flat conformation before it is formed into a channel-shaped cross section;

FIG. 4 is a longitudinal sectional view of portions of a fastener driving tool for driving fasteners supplied by the carrier of the present invention;

FIG. 5 is a transverse sectional view taken substantially along line 5—5 of FIG. 4;

FIG. 6 is a horizontal sectional view taken substantially along the line 6—6 of FIG. 5;

FIG. 7 is a transverse sectional view through the drive track of the tool taken along the line 7—7 of FIG. 6;

FIG. 8 is a schematic view similar to FIG. 5 graphically illustrating the manner in which the fasteners are removed from the carrier during a driving stroke of the driver; and FIG. 9 is a transverse sectional view taken along line 9—9 of FIG. 6.

Referring now, more particularly, to the drawings and especially to FIGS. 1 through 3 therein, there is illustrated a carrier 10 constructed in accordance with the present invention and adapted to hold a plurality of fasteners 12, such as common nails and the like, with shanks 12a of the nails in spaced-apart, parallel relation transversely of the strip and heads 12b of the nails aligned along one edge of the carrier and spaced apart from one another. The carrier strip 10 is formed from an elongated strip or ribbon of flexible plastic material, such as polypropylene, and, when flat, is cut or stamped to the shape shown in FIG. 3 or FIG. 3a. Subsequently, the strip is formed into a substantially channel-shaped cross section (shown in FIGS. 2, 5, 7, and 8) by bending, extending, or folding longitudinal edge portions of the strip along parallel cuts or grooves positioned as indicated by the lines A—A and B—B. When so formed, the carrier includes a web or body portion 10a, an upper flange portion 10b extending longitudinally along the upper edge of the web and bent laterally outward thereof, and a lower flange portion 10c extending longitudinally along the lower edge of the web and also bent laterally outward thereof in the same direction as the upper flange.

Each flange 10b and 10c is divided into a plurality of small, independently movable, longitudinally spaced, nail shank holding segments 14 which are spaced apart by laterally transverse slits or cuts 16 which extend from the outer free ends of the segments into the web 10a of the carrier. The slits 16 are wide enough (w, FIG. 3) to permit lateral coiling of the carrier strip in a clockwise or counterclockwise direction with respect to an axis parallel of the nail shanks held thereby (FIG. 1) without interference between the facing side edges (e, FIG. 3) of adjacent segments 14. Each slit 16 extends into the web 10a of the strip and terminates in a V-shaped notch 16a with its apex pointing toward the central longitudinal axis of the carrier strip. Each segment 14 is formed with a generally keyhole shaped slot 18 opening at the outer or free end of the segment, and includes a circular, inner end portion 18a which is adapted to receive and hold the shank 12a of a fastener 12.

Referring to FIG. 3, it will be seen that the keyhole slots 18 are relatively wide adjacent the outer edge of the flange segments 14 and are tapered to a narrower dimension inwardly of the outer edge at the junction with the circular inner end portion 18a. This widening of the slots adjacent the outer end of the segments facilitates the lateral insertion of the fasteners into the carrier. Where relatively large fasteners are used and increased holding power is required, a strip 10', as shown in FIG. 3a, may be provided instead of the strip 10 just described. The strip 10' is almost identical to the strip 10 except for the shape of the keyhole slots 18' in the segments 14' which are not widened by chamfering or rounding adjacent the outer edge of the segments. The slots 18' include portions 18b' of uniform narrow width extending outwardly from the circular inner end portion 18a' to the outer edge of the segments and, accordingly, the outer tip portions of the segments on opposite sides of the slots are somewhat stronger with a resultant increase in nail holding power. The segments 14 along the upper flange 10b have counterparts or aligned opposite segments 14 along the lower flange 10c of the carrier so that each nail 12 may extend generally transversely of the longitudinal axis of the carrier and will be held by a pair of segments.

The web portion 10a of the carrier is provided with a plurality of longitudinally spaced-apart, diamond-shaped openings 20 which are adapted to receive a lug or pawl of a reciprocating feed member used to advance the strip incrementally toward the drive track of the tool in a series of successive feeding strokes, as will be described more fully hereinafter.

As best shown in FIGS. 1 and 3, each diamond-shaped opening 20 is aligned directly between a pair of opposite notches 16a formed in the upper and lower edges of the web 10a. The upper and lower points or apexes of each diamond-shaped opening 20 lie on a common line S extending between the apexes of each pair of opposed notches 16a, and this alignment aids in the severance of the spent carrier strip, as will be described more fully hereinafter. The nail holding slots 18 are offset longitudinally of the diamond-shaped openings 20 in the web portion 10a, so that the feed pawl or lug can engage the carrier web rearwardly of a fastener shank and feed the fastener into the drive track while the pawl itself remains rearwardly clear of the drive track. Accordingly, every nail (including the last few nails at the end) in a carrier strip can be driven by the tool without difficulty, and this feature is an improvement over many arrangements wherein a new strip must be inserted into the tool before the old one is exhausted, a situation which sometimes resulted in jamming of the two strips in the tool and necessitated complete clearing of the tool magazine.

The ribbon material of the carrier 10 or 10', as indicated in FIGS. 3 and 3a, is formed with a pair of cuts or grooves on one face thereof, extending along a pair of longitudinal, parallel lines designated as A—A and B—B. The cuts or grooves may be formed by scribing the ribbon before or after it is cut or stamped to shape, or the grooves may be integrally formed in the ribbon by an extrusion process when the ribbon is initially formed. The segments 14 comprising the upper and lower flanges 10b and 10c are subsequently bent or folded along the grooves A—A and B—B to form the carrier into a substantially channel-shaped cross section, as best indicated in FIG. 2. The segments 14 preferably are flexed back and forth several times along the crease or fold lines A—A and B—B to orient the plastic material to provide a good hinge. It is desirable to provide a good hinge characteristic to avoid separation of the segments 14 from the web portion 10a when the nails 12 are driven.

The upper and lower segments 14 comprising the flanges 10b and 10c of the formed carrier may be parallel but, preferably, are slightly divergent from one another so that the carrier strip may be nested, as shown in FIG. 2, with the web portion 10a of one segment of the strip bearing against the shanks 12a of the nails held in another segment of the strip. It should also be noted from FIGS. 3 and 3a that the slots and circular portions thereof, 18 and 18a and 18' and 18a', respectively, are spaced toward the outer extremities of the respective segments 14 and 14' so that the heads 12b of the nails in one section of the strip do not interfere with those in another when the strip is coiled and nested as shown. A large number of nails can be held in relatively small space by the carrier 10 when it is coiled and nested as indicated in FIGS. 1 and 2, and as nails are driven from the carrier strip by the tool, the strip is advanced and slowly uncoiled by movement in the direction of the arrow C (FIG. 1).

Referring now, more specifically, to FIGS. 4 through 9, therein is illustrated a fastener driving tool 24 which is adapted for driving nails 12 supplied from a carrier strip 10 or 10' constructed in accordance with the present invention. The tool 24 includes a reciprocating driver 26 which is adapted to reciprocate up and down within a drive track 28 extending from the lower end of a pneumatic cylinder assembly 30. The nails 12 supplied on the carrier 10 or 10' are advanced into the drive track 28 from a rearwardly extending magazine assembly 32, and the drive track is provided with an entrance opening 28a facing rearwardly and communicating with the forward end of the magazine. The drive track also includes forwardly facing exit opening 28b for permitting the spent strip from which the nails have been driven to move forwardly out of the drive track.

As best shown in FIG. 7, the magazine 32 includes a pair of spaced-apart, opposite sidewalls 34 and 36, a bottom wall 38, and top wall 40. The sidewall 36 is provided with a longitudinally extending recess 36a on its inner face in order to accommodate the laterally offset web portion 10a of the carrier strip, and the opposite sidewall 34 includes a pair of spaced-apart, longitudinally extending recesses 34a and 34b for accommodating the outer ends of the segments 14 making up the upper and lower flanges 10b and 10c, respectively.

In order to guide and support the strip 10 passing forwardly out of the exit opening 28b in the drive track 28 and thereby prevent cocking or misalignment of the nails in the magazine or drive track, especially when only a few nails are remaining at the end of the strip, the tool 24 includes a wall extension 41 (FIGS. 4, 6, and 9) mounted to extend forwardly of the drive track and generally in line with the axis of the magazine. The wall extension 41 includes a U-shaped portion having a pair of convergent, spaced-apart sidewalls 41a and 41b which act to fold the segments 14 on the upper and lower flanges 10b and 10c downwardly toward alignment with the web 10a of the carrier. The folding action of the convergent sidewalls tends to weaken the carrier strip against lateral bending and, accordingly, more readily permits twisting of the protruding end of the strip to facilitate tearing or shearing of the strip along the lines S extending through the axis of a diamond-shaped opening 20 and aligned notches 16a. Specifically, a tool operator can readily break or sever the strip manually by twisting the strip about its longitudinal axis, as shown in FIG. 9, by the arrow D. The strip 10 almost always shears or tears along the transverse lines S which are located at the regions of minimum cross section in the strip between the apexes of the sharpened notches 16a and opposite points of the diamond-shaped openings 20.

More specifically, a plastic material, such as polyproylene, exhibits a "notch effect" which is used in the present invention to provide a carrier which is flexible and very resistant to inadvertent shearing or tearing, but which can easily be severed at predetermined points by intent. It is necessary to provide a carrier 10 and 10' that tenaciously holds the fastener 12 in place during handling and feeding in order to insure that the fasteners are properly presented to the drive track 28 in an aligned position with the driver 26. If the nails 12 are allowed to move vertically relative to the carrier 10 (FIG. 4), they could engage the housing of the tool or magazine and interfere with proper feeding. Also, the fastener 12 must be held equally by both of the segments 14 during driving to avoid tipping in the drive track 28, and this is provided by the carrier strips 10 and 10' of the invention. Further, the carrier 10 and 10' should provide "hinge" connections to the segments 14 and 14' to permit these segments to deflect downwardly (FIG. 4) as the fastener 12 is driven to both avoid any tipping or cocking of the fastener and to prevent the segments 14 and 14' from separating from the carrier 10 and 10' thereby preventing clogging of the feed mechanism and path and the drive track 28. However, it is also necessary to be able to easily tear the expended portion of the carrier 10 or 10' from the remainder so that, for instance, the force applied to the carriers 10 and 10' to tear it does not have to be so great as to pull the carrier 10 or 10' containing fasteners 12 out of its indexed position. Such displacement of the carrier 10 or 10' would, for instance, move the nail 12 in the drive track 28 into a misaligned position.

In accordance with the present invention, these seemingly inconsistent characteristics of tough flexibility and tenacious holding on the one hand and easily manual tearing of the carrier 10 or 10' can be obtained in a single carrier. The carriers 10 and 10' are made of a material, such as polypropylene, which has the required flexibility, resistance to tearing, and holding power. By flexing the flange portions 10b and 10c along the lines A—A and B—B, the grain of the material is oriented to provide the hinge characteristic that is desirable for the segments 14 and 14'. To provide easy tearing of the strip, the carriers 10 and 10' are notched at the points at which they are to be severed or torn so that stress is focused at these points. This focusing of stress in the notched areas or points permits the carriers 10 and 10' easily to be separated. As an example, the acute angles formed at the ends of the diamond openings 20 and the slots 16 focus stress at these points to permit easy tearing of the carriers 10 and 10' while curved or straight surfaces at these points would distribute stress and make the tearing of the carriers 10 and 10' quite difficult. The openings 20 could be of different shapes that focus stress and could also be formed as groups at spaced openings.

In order to move the carrier 10 and the nails 12 forwardly in the magazine 32 so that successive nails will be centered in the drive track 28 for driving by the reciprocating driver 26, the tool 24 includes a nail feeding mechanism 42 mounted on one side of the drive track 28 and magazine assembly 32 (FIGS. 5 and 6). The feeder mechanism 42 includes a cylinder 42a with a piston 44 mounted therein for longitudinal sliding movement, and one end of the cylinder 42a is connected to a source of compressed fluid or the atmosphere via a line 46 while the opposite end is vented to the atmosphere by a vent passage 48. A spring 50 is mounted in the vented end of the cylinder and normally biases the piston 44 toward the left (FIG. 6) to the position shown in dotted lines.

The spring 50 causes the piston to move leftward on a return stroke after each feeding stroke in the opposite direction has been completed by the introduction of pressurized fluid into the left-hand end of the cylinder. In the embodiment shown, the feed stroke is accomplished by fluid pressure, and the return stroke by spring pressure. It is to be understood that this arrangement could be reversed by placing the spring 50 in the left-hand end of the cylinder and connecting the fluid pressure line 46 to the left-hand end. In this instance, a feed stroke would be initiated by spring bias and the return stroke effected by fluid pressure.

In order to engage the carrier 10 and advance it forwardly to position successive nails 12 in the drive track 28, a lug or feed pawl 44a extends laterally outward from one side of the piston member 44 through a longitudinal slot 52 formed in the magazine sidewall 36. As viewed in FIG. 6, the feed pawl 44a includes a pointed tip or outer end defined by a slanted outer end surface 45 which intersects a leading edge surface 47 normal to the longitudinal axis of the magazine assembly. The pointed tip of the lug 44a is adapted to extend into the openings 20 in the web 10a of the carrier, and as the piston 44 moves forwardly within the cylinder 42a, the leading edge surface 47 engages the forward edge of an opening 20 in the carrier strip and moves the strip forwardly to position the next nail 12 in the drive track 28. After each nail is driven, the piston 44 moves rearwardly (to the left) on a return stroke, and during the return stroke the carrier 10 and nails 12 held therein are restrained against leftward movement by a spring backup pawl 51. The backup pawl is formed of spring steel and includes a nail engaging portion 51a which normally projects inwardly into the drive track through an opening in the sidewall 34. The tip portion 51a of the pawl engages the nails 12 and prevents their rearward travel in the magazine, yet permits the nails to be advanced forwardly toward the drive track.

The slanted outer end surfaces 45 on the lug 44a merely deflects or cams the midportion of the web 10 laterally toward the nails during a return stroke until the tip portion of the lug 44a moves rearwardly to a position adjacent the next successive rearward opening 20 in the strip. The tip portion of the lug then extends into the opening and the strip returns to a normal lateral position. The feeding cycle is then repeated and the next nail 12 is advanced into the drive track. Because the carrier strip 10 is constructed of flexible material, complicated pawl and ratchet feeding mechanisms are not required, and the simple feed pawl or lug 44a and backup pawl 51 are sufficient. It should be understood that the illustrative embodiment can be modified or reversed so that the feed pawl or lug 44a acts directly on the nail shanks 12a to effect a feed stroke, and the backup pawl 51 engages the diamond-shaped openings 20 in the carrier to prevent rearward movement thereof during a return stroke.

Referring to FIG. 4, when a drive stroke is initiated by supplying compressed fluid to move the driver 26 rapidly downward in the drive track 28, the nail 12 that is positioned in the drive track is driven rapidly downward into a workpiece. As a driving stroke occurs (FIG. 8), the nail holding segment 14 on the upper flange 10b of the strip is pivoted about the axis A—A by the downward travel of the nail and driver 26 and the upper portion of the nail shank is cleanly released so that the nail is driven into the workpiece without any pieces of the carrier strip or adhesive material clinging thereto. After the segment 14 on the upper flange 10b has released the nail during the first portion of the driving stroke, the nail shank is still held in a centered position in the drive track by the nailhead 12b and the segment 14 of the lower flange 10c of the carrier. Accordingly, cocking of a nail in the drive track during a driving stroke is positively prevented. As the driving stroke continues downwardly, the segment 14 on the lower flange 10c of the carrier is pivoted about the axis B—B to finally and completely release the nail shank. Release of the nail shank by the lower flange segment is accomplished in the same manner but at a later time during the driving stroke than the release by the upper flange segment. The nail may be positively centered and guided in the drive track while it is being driven until the point of the nail shank penetrates the workpiece. Accordingly, the chances of a nail becoming cocked or jammed in the drive track or being bent over or driven at an angle into the workpiece are greatly reduced. The hinged upper and lower segments not only release the nail cleanly, but provide positive guiding action during a driving stroke. When a driving stroke has been completed, the driver 26 moves upwardly on a return stroke to the position shown in FIG. 4, and the piston 44 is activated to feed a new nail in the drive track. During a feeding stroke of the piston, the forward edge 47 of the feed pawl 44a is engaged against the forward edge of an opening 20 in the web 10a and the strip is thereby advanced forwardly until the next nail 12 is positioned in the drive track 28.

Because the openings 20 are offset longitudinally rearwardly of the nail holding slots 18, the feed pawl 44a is always rearwardly of the drive track 28 and, accordingly, the last nail in the carrier can be fed into the drive track without difficulty. The fact that the outer end surface 45 of the feed pawl 44a, which extends rearwardly and outwardly of the web, is slanted and because of the flexible material of which the carrier strip 10 is constructed, the web 10a is merely deflected laterally when the feed piston 44 moves on a return stroke, and when the forward edge 47 of the lug reaches a position adjacent the next rearward opening 20 in the web of the strip, the web then snaps back laterally to a normal position.

The unique construction of the carrier strip 10 of the present invention enables the fasteners to be cleanly removed from the carrier during a driving stroke and without fragmentation of the strip. No adhesives are required to hold the nails in the carrier strip and the strip can be coiled to conserve space.

What is claimed and desired to be secured by Letters Patent of the United States is:

1. A carrier for holding a plurality of fasteners with their shanks in spaced-apart, parallel relation comprising an elongated, flexible strip of plastic material extending transversely of said fastener shanks, said strip including a web portion laterally offset from said shanks and two rows of spaced segments along the edges of said web portion, said segments extending generally transverse to the plane of said web portion for supporting said fasteners, and each including a free outer end and an inner end hingedly joined to said web portion, each of said segments being spaced apart from adjacent segments in the same row defining slit means therebetween, said slit means extending between the outer end of an adjacent segment and terminating in said web portion, means in each segment defining a slot opening at said outer end thereof for receiving a fastener with the slots in segments of one row aligned with the slots in corresponding opposite segments in the other row, and means defining a plurality of longitudinally spaced-apart openings in said web portion, each of said openings being offset longitudinally on said strip between adjacent fasteners held thereby.

2. The carrier of claim 1 wherein said slit means terminate in V-shaped notches formed in said web portion with the apexes of said notches along one edge of the web aligned with the openings in said web portion and with the apexes of corresponding notches along the other edge of the web.

3. The carrier of claim 2 wherein said web openings are diamond shaped with opposite apexes thereof aligned in a common line with the apexes of the notches along the longitudinal edges of said web portion.

4. The carrier of claim 1 in combination with fasteners of the type having enlarged heads at one end of their shanks wherein said shank receiving slots are positioned in said segments to accommodate said shanks in a position wherein the heads of said fasteners extend laterally outward of the free ends of said segments.

5. The combination of claim 4 wherein the innermost portions of the heads of said fasteners are spaced laterally outward of the web portion of said strip toward the free end of said segments to permit lateral nesting of different longitudinally spaced sections of the carrier together with the fastener shanks in one section bearing against the web portion of a different section without interference between the heads of the fasteners carried thereby.

6. The combination of claim 5 wherein corresponding segments on opposite edges of said strip diverge away from one another to a maximum spacing at the outer ends thereof, whereby the web portion of one section of the strip can be spaced between the free ends of the segments on a different section in nested relation therewith.

7. A strip of fasteners comprising an elongated flexible strip of plastic material having a web portion and first and second rows of spaced apart elements extending along the edges of the web portion, each of the elements being integrally joined to the web portion by a flexed hinge portion and being disposed in a position generally transverse to the plane of the web portion, each of said elements including a fastener receiving opening, a plurality of fasteners each removably received in the openings of two generally aligned elements, one in the first row and one in the second row, and a series of openings in the web portion and defining notches to focus stress at positions located between adjacent pairs of the elements so as to permit the strip to be severed at said positions.

8. A flexible strip of fasteners comprising an elongated web of flexible material, a first line of tabs hingedly connected to one longitudinally extending edge of the web, a second line of tabs hingedly connected to the other longitudinally extending edge of the web, the individual tabs of the first and second lines being generally aligned with each other in a direction transverse to the length of the web, each of the latter being movable relative to the web independent of movement of the adjacent tabs in the line, each of said tabs having a fastener receiving opening therein, a plurality of fasteners, each disposed in the opening of a pair of transversely aligned tabs in the first and second lines and held in position on the web by the tabs, said fasteners being slidable in the openings in the tabs when driven in a direction generally parallel to the web and transverse to its direction of elongation first to be separated from the tab in one of the lines and subsequently from the tab in the other of the lines, the movement of the fasteners causing a deflection of the tabs in which it is received independently of appreciable deflection of the adjacent tabs of the lines.

9. In combination, a carrier for holding fasteners comprising an elongated strip of flexible material having a substantially channel-shaped transverse cross section including a continuous elongated web and longitudinally spaced pairs of facing, independently movable, flange segments hingedly affixed at their inner ends to respective upper and lower longitudinal edges of the web, each of said segments having an opening defined therein outwardly of said inner end to receive and hold the shank of an elongated fastener extending parallel to said web and transverse to the length of said strip, a plurality of fasteners, each having a shank extending through the openings in a facing pair of said flange segments on opposite edges of said web and movable longitudinally to pivot a first one of said pair of segments about an edge of said web independent of adjacent segments along said edge to a deflected position toward said web wherein the shank is disengaged from the segment while still being held by the other segment of said pair and subsequently movable further longitudinally to pivot said other segment of said pair about the opposite edge of said web independent of adjacent segments along said opposite edge to a deflected position wherein the shank is completely released from said carrier.

10. The combination of claim 9 wherein said flange segments include free outer edges and said openings defined in said segments are keyhole shaped and open onto said free edges.

References Cited

UNITED STATES PATENTS

| 3,048,268 | 8/1962 | Rocchi et al. | 206—65 |
| 1,337,212 | 4/1920 | Elliott | 206—560 |
| 1,445,569 | 2/1923 | Tiffany | 206—56 |
| 3,213,559 | 10/1965 | Matich. | |

FOREIGN PATENTS

| 50,401 | 9/1966 | Germany. |
| 635,848 | 3/1962 | Italy. |

JOSEPH R. LECLAIR, *Primary Examiner.*

J. M. CASKIE, *Assistant Examiner.*